US012414197B2

(12) United States Patent
Prabhakar et al.

(10) Patent No.: US 12,414,197 B2
(45) Date of Patent: Sep. 9, 2025

(54) AUTHORIZATION REVOCATION FOR UNMANNED AERIAL VEHICLES

(71) Applicant: Apple Inc., Cupertino, CA (US)

(72) Inventors: Alosious Pradeep Prabhakar, Singapore (SG); Vijay Venkataraman, San Jose, CA (US); Krisztian Kiss, Hayward, CA (US); Jordi Agud Ruiz, Meguro-ku (JP); Mohammed Sadique, Parramatta (AU); Cahya A. Masputra, San Jose, CA (US); Srinivasan Nimmala, San Jose, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 505 days.

(21) Appl. No.: 17/174,701

(22) Filed: Feb. 12, 2021

(65) Prior Publication Data
US 2021/0259045 A1 Aug. 19, 2021

Related U.S. Application Data

(60) Provisional application No. 62/976,465, filed on Feb. 14, 2020.

(51) Int. Cl.
H04W 76/30 (2018.01)
B64U 10/14 (2023.01)
(Continued)

(52) U.S. Cl.
CPC ............ *H04W 76/30* (2018.02); *B64U 10/14* (2023.01); *G05D 1/0022* (2013.01); *G05D 1/106* (2019.05);
(Continued)

(58) Field of Classification Search
CPC ..... H04W 76/30; H04W 84/402; H04W 4/44; H04W 12/50; G05D 1/106; G05D 1/0022;
(Continued)

(56) References Cited

U.S. PATENT DOCUMENTS 9,079,505 B1 * 7/2015 Hyde ................... G08G 1/202
9,412,278 B1 * 8/2016 Gong ................... G06F 21/44
(Continued)

FOREIGN PATENT DOCUMENTS

WO 2019148317 A1 8/2019

OTHER PUBLICATIONS

Fredrik Larsson, et al., "Assessment of IxLoad in a GGSN environment", 2010, <https://odr.chalmers.se/server/api/core/bitstreams/bef1b99b-97de-41ae-be6f-d9115f2679eb/content> (Year: 2010).*

(Continued)

Primary Examiner — Helal A Algahaim
Assistant Examiner — Karen Lynelle Furgason
(74) Attorney, Agent, or Firm — Kowert, Hood, Munyon, Rankin & Goetzel, P.C.

(57) ABSTRACT

Apparatuses, systems, and methods for performing authorization revocation for unmanned aerial vehicles. A cellular network element of a cellular network may receive a request to revoke authorization of a wireless device that is an element in an unmanned aerial system. The cellular network element may provide an indication to the wireless device to disconnect from any other elements of the unmanned aerial system based at least in part on the request to revoke authorization.

20 Claims, 11 Drawing Sheets

(51) Int. Cl.
  *G05D 1/00* (2024.01)
  *G08G 5/55* (2025.01)
  *G08G 5/57* (2025.01)
  *H04W 84/04* (2009.01)
(52) U.S. Cl.
  CPC .................. *G08G 5/55* (2025.01); *G08G 5/57* (2025.01); *B64U 2201/10* (2023.01); *B64U 2201/20* (2023.01); *H04W 84/042* (2013.01)
(58) Field of Classification Search
  CPC .............. B64C 39/024; B64U 2201/10; B64U 2201/13
  USPC .......................................................... 701/2
  See application file for complete search history.

(56) References Cited

U.S. PATENT DOCUMENTS

| | | | |
|---|---|---|---|
| 10,271,303 B2* | 4/2019 | Gupta | H04W 4/06 |
| 10,880,070 B1* | 12/2020 | Delaney | G06F 21/64 |
| 11,218,840 B2* | 1/2022 | Mahkonen | H04W 4/029 |
| 2014/0359045 A1* | 12/2014 | Mirarchi | H04L 67/568 |
| | | | 709/213 |
| 2018/0096609 A1 | 4/2018 | de la Cruz et al. | |
| 2018/0159693 A1* | 6/2018 | Condeixa | H04L 63/0823 |
| 2018/0253092 A1 | 9/2018 | Esteban et al. | |
| 2019/0051190 A1 | 2/2019 | Russell et al. | |
| 2020/0236602 A1* | 7/2020 | Mahkonen | H04W 76/25 |
| 2020/0396642 A1* | 12/2020 | Wang | H04W 28/08 |
| 2022/0085871 A1* | 3/2022 | Hong | H04W 76/34 |
| 2022/0187851 A1* | 6/2022 | Poscher | G08C 17/00 |

OTHER PUBLICATIONS

ETSI, "5G System; Session Management Services", 2018, <https://www.etsi.org/deliver/etsi_ts/129500_129599/129502/15.00.00_60/ts_129502v150000p.pdf> (Year: 2018).*

* cited by examiner

AUTHORIZATION REVOCATION FOR UNMANNED AERIAL VEHICLES

PRIORITY INFORMATION

This application claims priority to U.S. provisional patent application Ser. No. 62/976,465, entitled "Authorization Revocation for Unmanned Aerial Vehicles," filed Feb. 14, 2020, which is hereby incorporated by reference in its entirety as though fully and completely set forth herein.

FIELD

The present application relates to wireless devices, and more particularly to apparatus, systems, and methods for performing authorization revocation for unmanned aerial vehicles in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing authorization revocation for unmanned aerial vehicles in a wireless communication system.

According to the techniques described herein, an unmanned aerial system traffic controller deployed in a cellular network may receive an request, e.g., from a third party, to revoke authorization for a currently registered and authorized wireless device that is part of an unmanned aerial system that is connected with the cellular network.

Based on the request, the cellular network may revoke authorization for the wireless device. This may include the unmanned aerial system traffic management function providing a configuration update, de-registration request, or other message indicating to the wireless device that its authorization is revoked and to disconnect from any other wireless devices in the unmanned aerial system, potentially including providing cause code information to the wireless device. The message(s) may be provided by way of one or more other cellular network elements, such as an access and management function.

The wireless device in the unmanned aerial system could be an unmanned aerial vehicle or an unmanned aerial controller. In the case of an unmanned aerial vehicle, the wireless device may be aerial or may be grounded when its authorization is revoked. If the wireless device is aerial, or possibly even if grounded, the unmanned aerial system traffic management function may navigate the wireless device to a desired location (e.g., that may be indicated by the third party requesting the authorization revocation, or may be determined in any of various other possible ways), e.g., including landing the wireless device. This may be accomplished by providing command & control messages from the unmanned aerial system traffic management function to the wireless device, at least as one possibility.

In the case of an unmanned aerial controller, the unmanned aerial system traffic management function may instruct the unmanned aerial controller to disconnect from any unmanned aerial vehicles that are currently under the control of the wireless device, and may take control of any such unmanned aerial vehicles, e.g., potentially including navigating any or all of the unmanned aerial vehicles to one or more desired locations.

The techniques described herein may be implemented in and/or used with a number of different types of devices, including but not limited to cellular phones, tablet computers, wearable computing devices, portable media players, unmanned aerial vehicles, unmanned aerial controllers, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
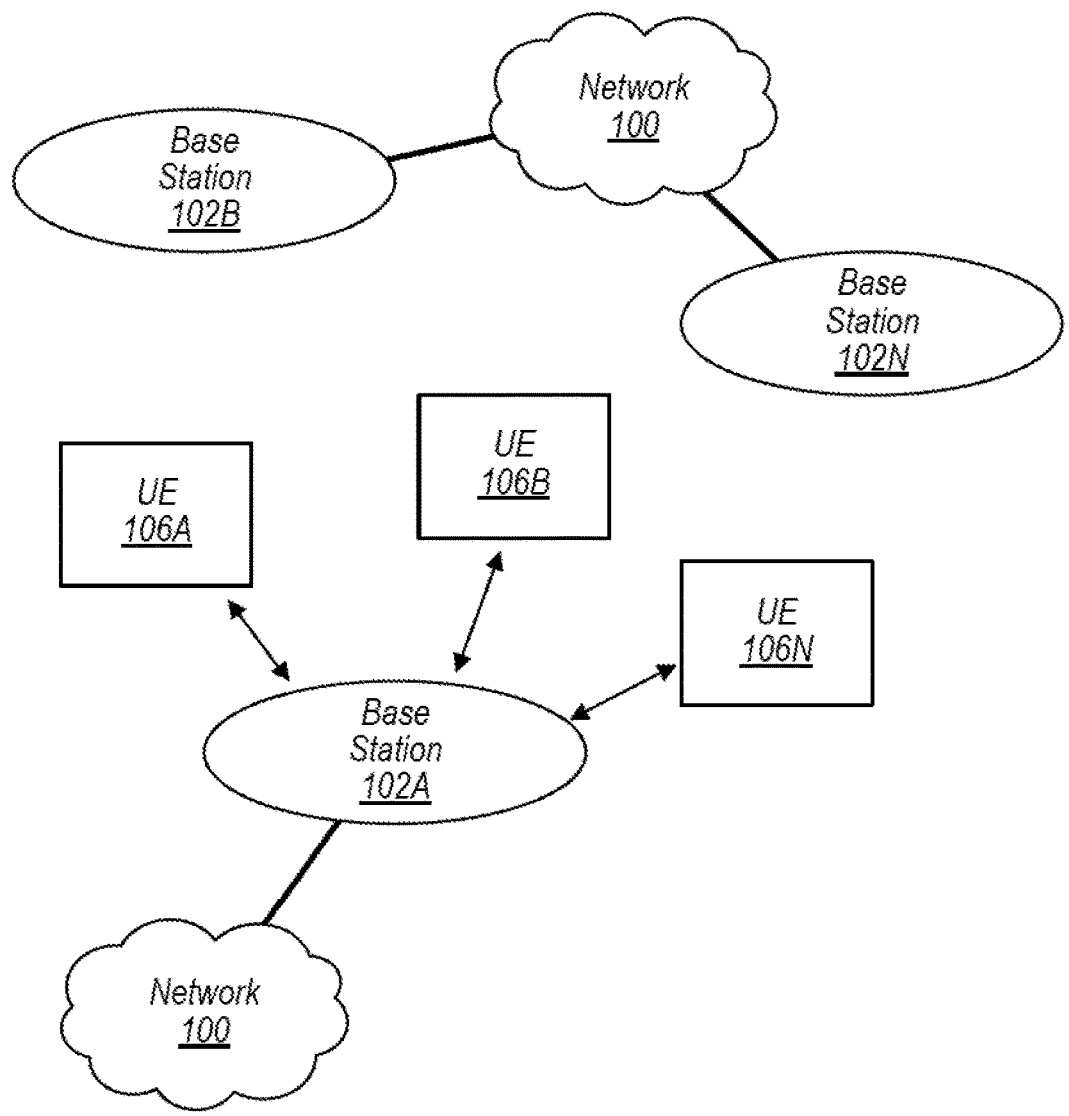
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
UAV: Unmanned Aerial Vehicle
UAC: Unmanned Aerial Controller
UAS: Unmanned Aerial System
UTM: UAS Traffic Management
C2: Command & Control
BLOS: Beyond Line of Sight

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
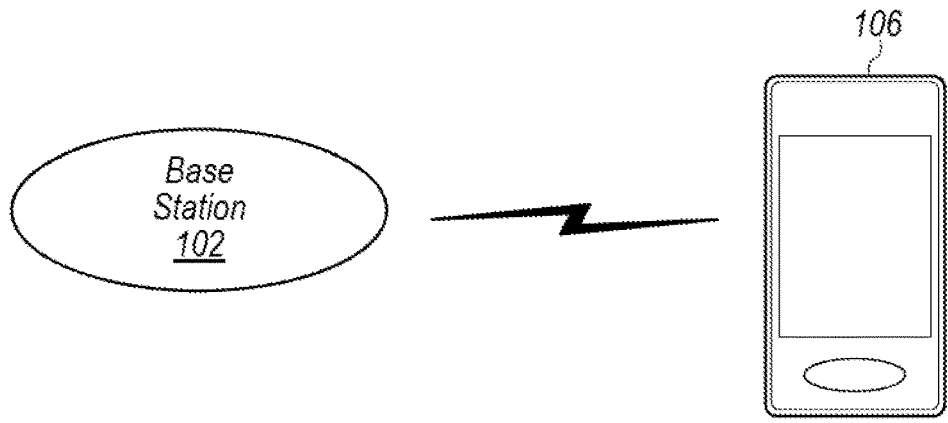
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controller (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
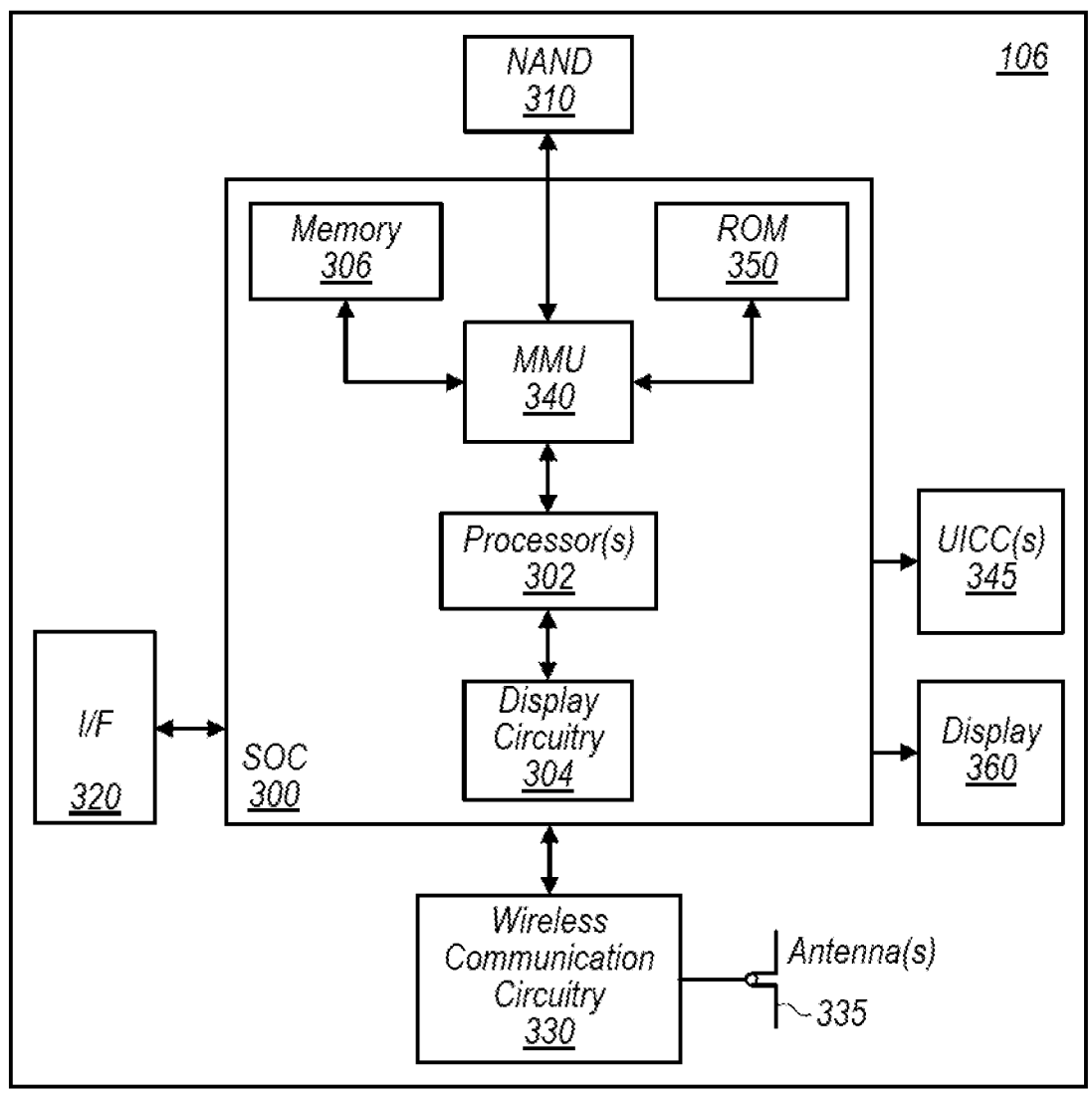
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), an unmanned aerial controller (UAC), an automobile, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
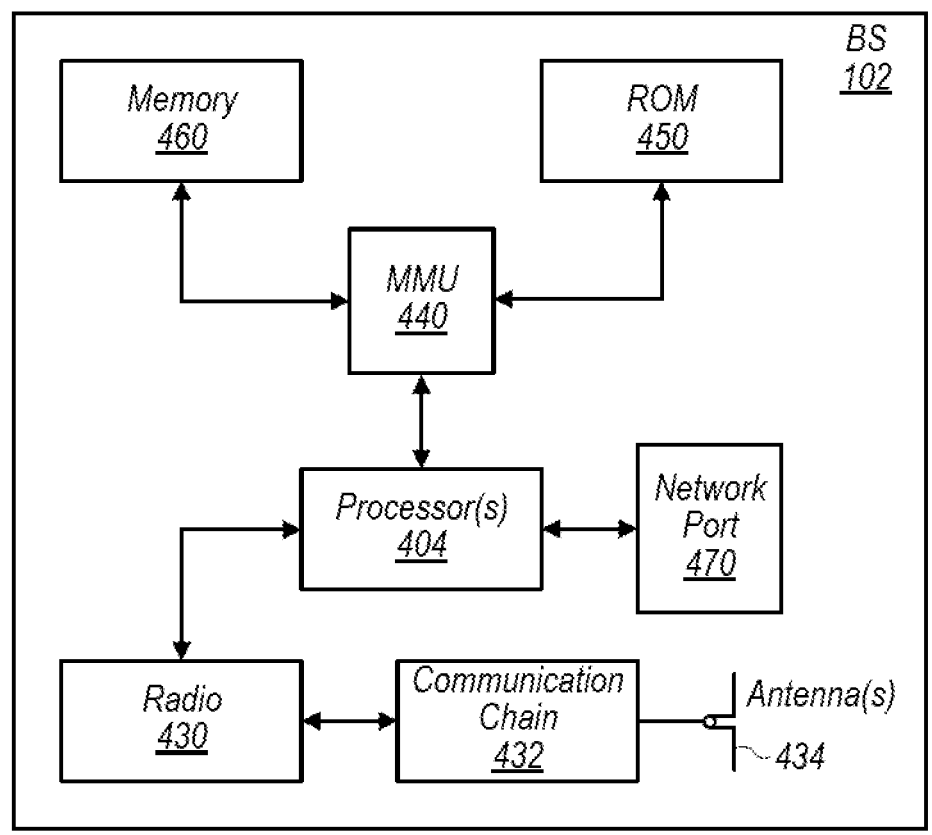
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
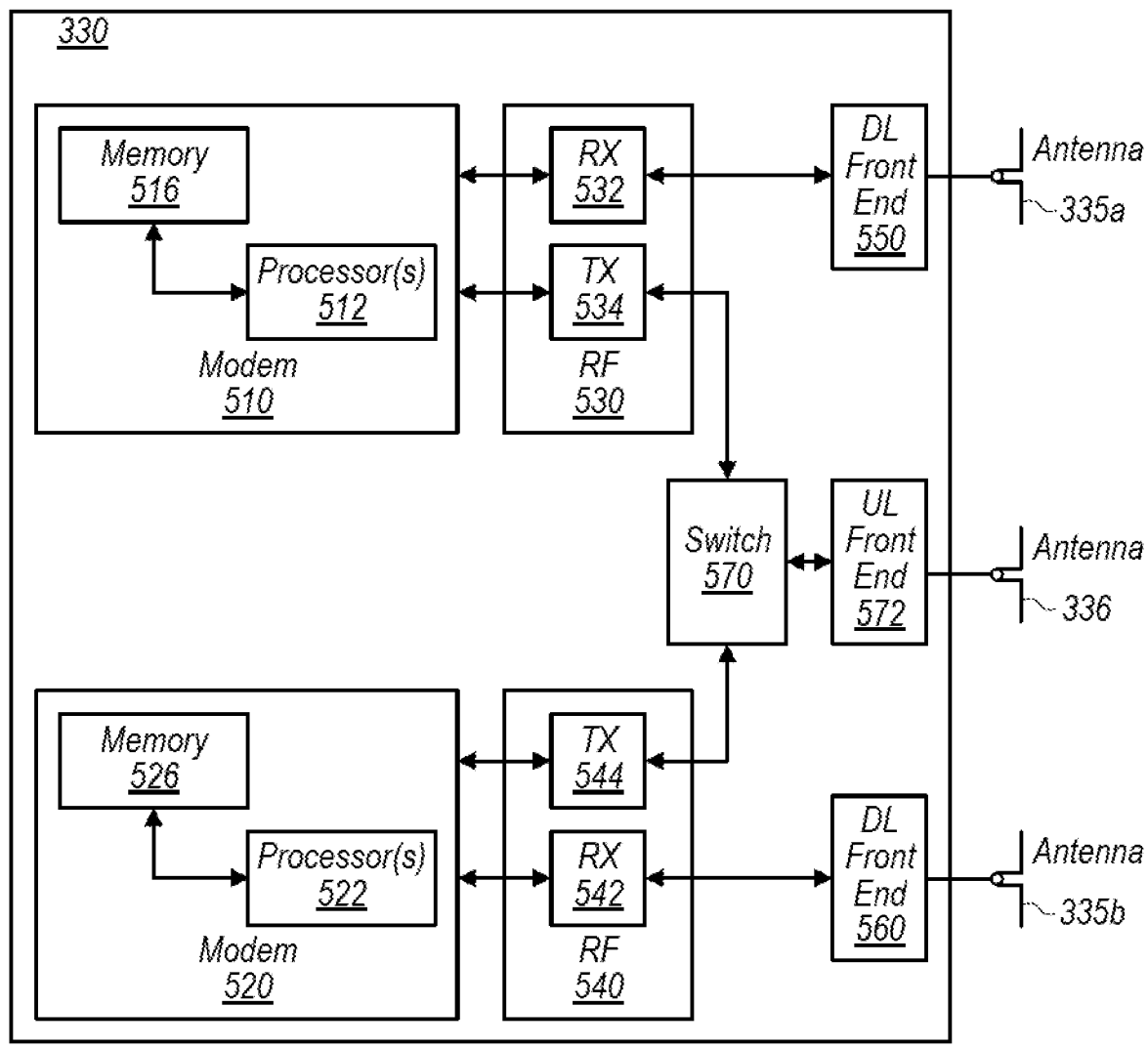
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), an unmanned aerial controller (UAC), an automobile, and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
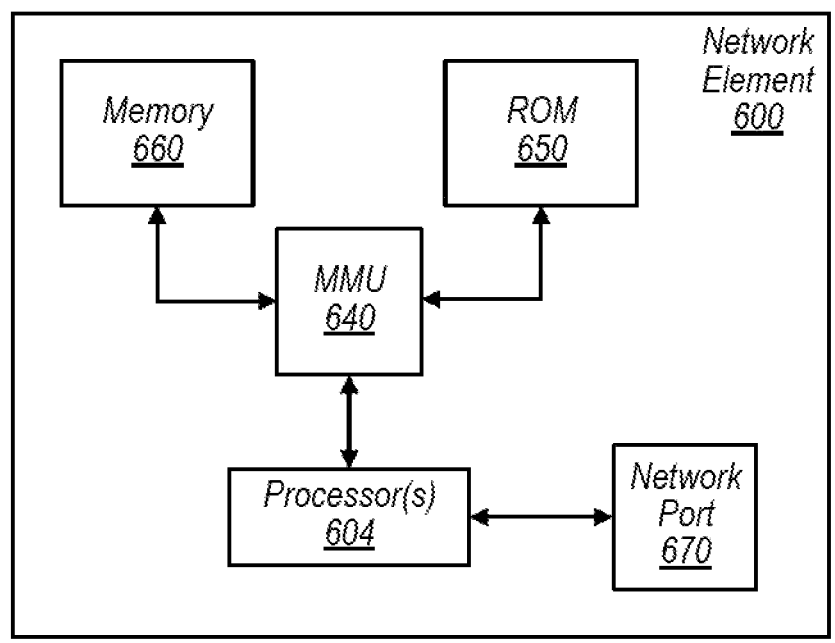
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), Unmanned Aerial System Traffic Management (UTM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementaiton of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
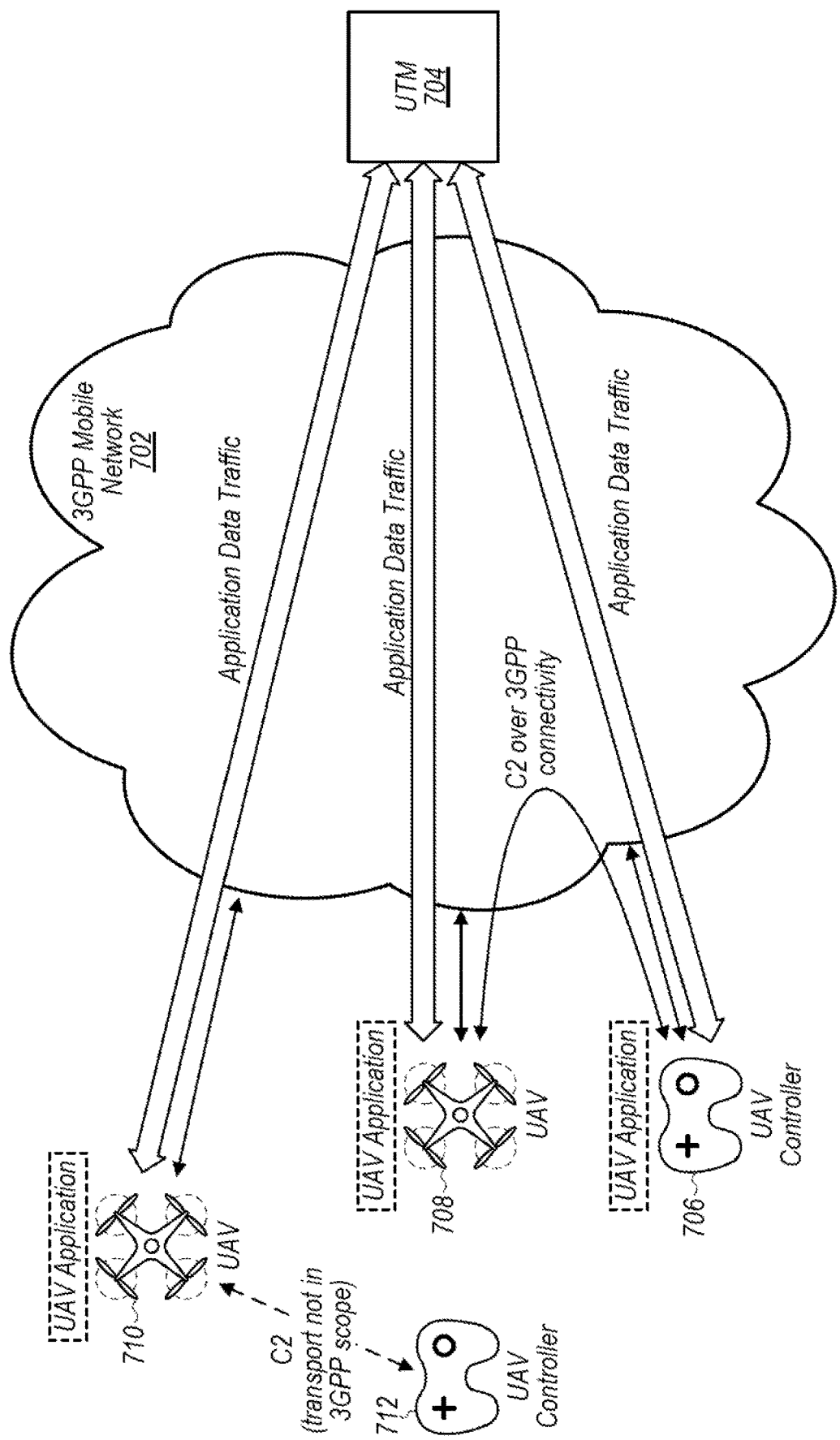
FIG. 7 is a flowchart diagram illustrating an example method for performing authorization revocation for unmanned aerial vehicles in a wireless communication system; according to some embodiments.
Figure 8:
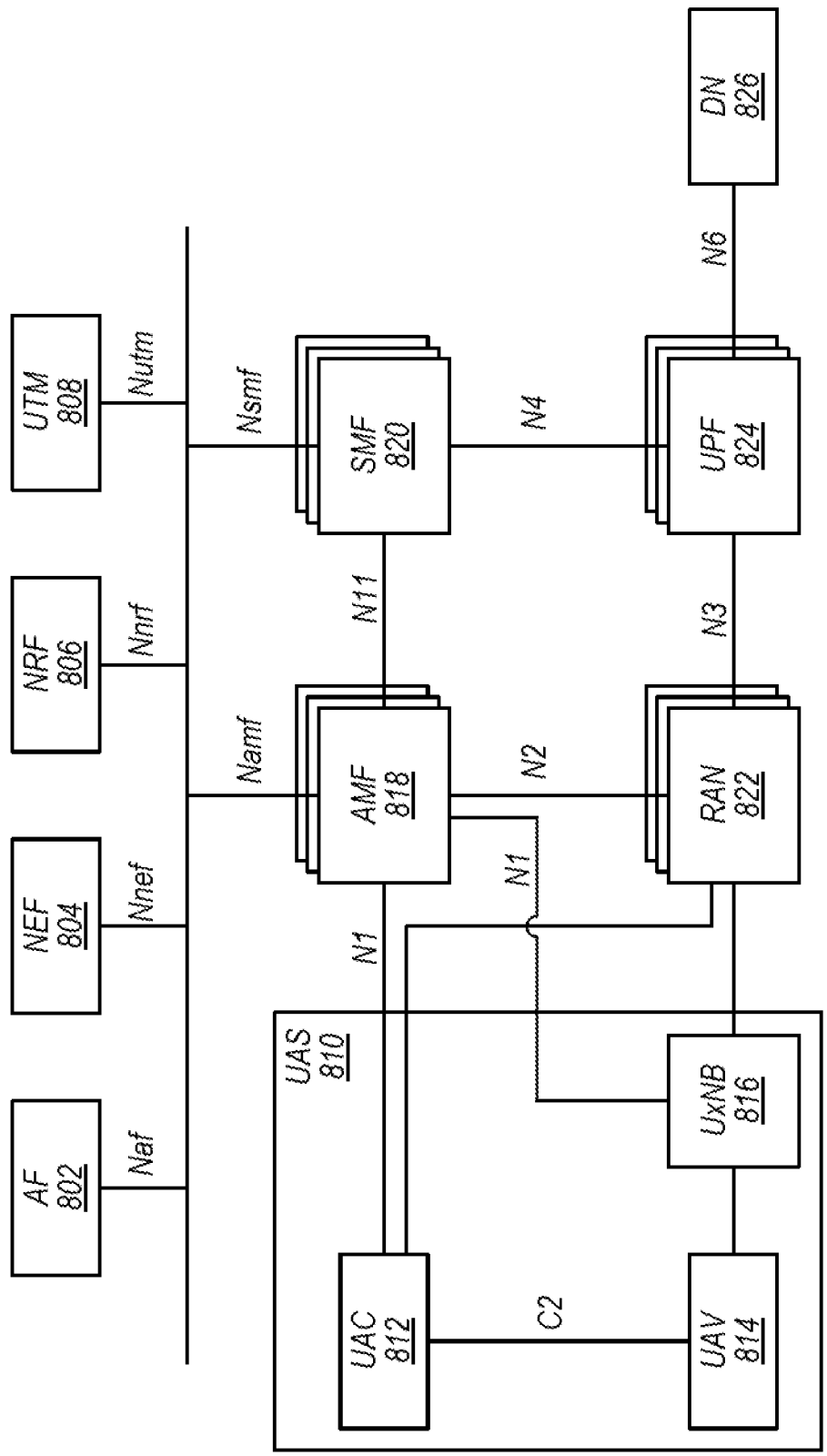
FIG. 8 illustrates an example wireless communication system that includes an unmanned aerial system, according to some embodiments.

FIGS. 7-8—Unmanned Aerial Systems

3GPP cellular communication systems may include support for unmanned aerial system (UAS) communications, potentially including communications with or between unmanned aerial vehicles (UAVs) and unmanned aerial controllers (UACs) configured to provide commands to those UAVs, at least according to some embodiments. FIG. 7 illustrates one example of a reference 3GPP based communication system including support for UAS communications. As shown, in the illustrated scenario, a 3GPP mobile network 702 may provide cellular connectivity with a UAS traffic management (UTM) function 704 to several wireless devices, including a UAV controller 706 and UAVs 708, 710. Additionally, one or more wireless devices (such as UAV controller 712) may be outside of communication range or otherwise not connected with the 3GPP mobile network 702.

At least according to some embodiments, a UAS may include at least one UAV and related functionality for the UAV, including C2 links between the UAV and the control station (e.g., UAC), the UAV and the network, and identification information for remote identification. At least in some instances, each UAS may be composed of one UAV controller and one or more UAVs. A UAV controller may include any of various devices configured to enable a user (pilot) to control a UAV, e.g., potentially beyond line of sight (BLOS)/beyond visual line of sight (BVLOS).

The UAVs may be connected over cellular connectivity, and may be controlled by a UAV controller connected via the 3GPP mobile network (e.g., such as in the case of UAC 706 and UAV 708). A UAV may also or alternatively be controlled by a UAV controller not connected via the 3GP mobile network, e.g., using a C2 interface (e.g., a D2D communication technique) that may be outside of 3GPP scope. A UAV controller connected to a UAV via the 3GPP mobile network may control one or more UAVs. A UAS may exchange application data traffic (e.g., including C2 signaling, software updates, data, and/or any of various other possible traffic) with the UTM 704.

FIG. 8 illustrates aspects of one possible cellular core network architecture including such a UTM function, according to some embodiments. The UTM function 808 may provide a set of functions and services for managing a range of autonomous vehicle operations, potentially including C2 communication, which may include the user plane link to deliver messages with information of command and control for UAV operation from a UAV controller or a UTM to a UAV, among various other possible functions and services.

As shown, the cellular core network may also include an application function (AF) 802, a network exposure function (NEF) 804, a network function repository function (NRF) 806, the UTM function 808, one or more access and management functions (AMFs) 818, and one or more session management functions (SMFs) 820. The cellular network may be accessible to a UAS 810, which may include a UAC 812 and a UAV 814 (which may in turn include a UxNB 816, e.g., a radio access node on-board the UAV for performing cellular communication) via one or more radio access networks (RANs) 822, and may also provide access to one or more data networks (DNS) 826 via one or more user plane functions (UPFs) 824. Note that the cellular network architecture illustrated in FIG. 8 is provided by way of example only, and that numerous other cellular network architectures (and/or variations on the illustrated cellular network architecture) are also possible.

Figure 9:
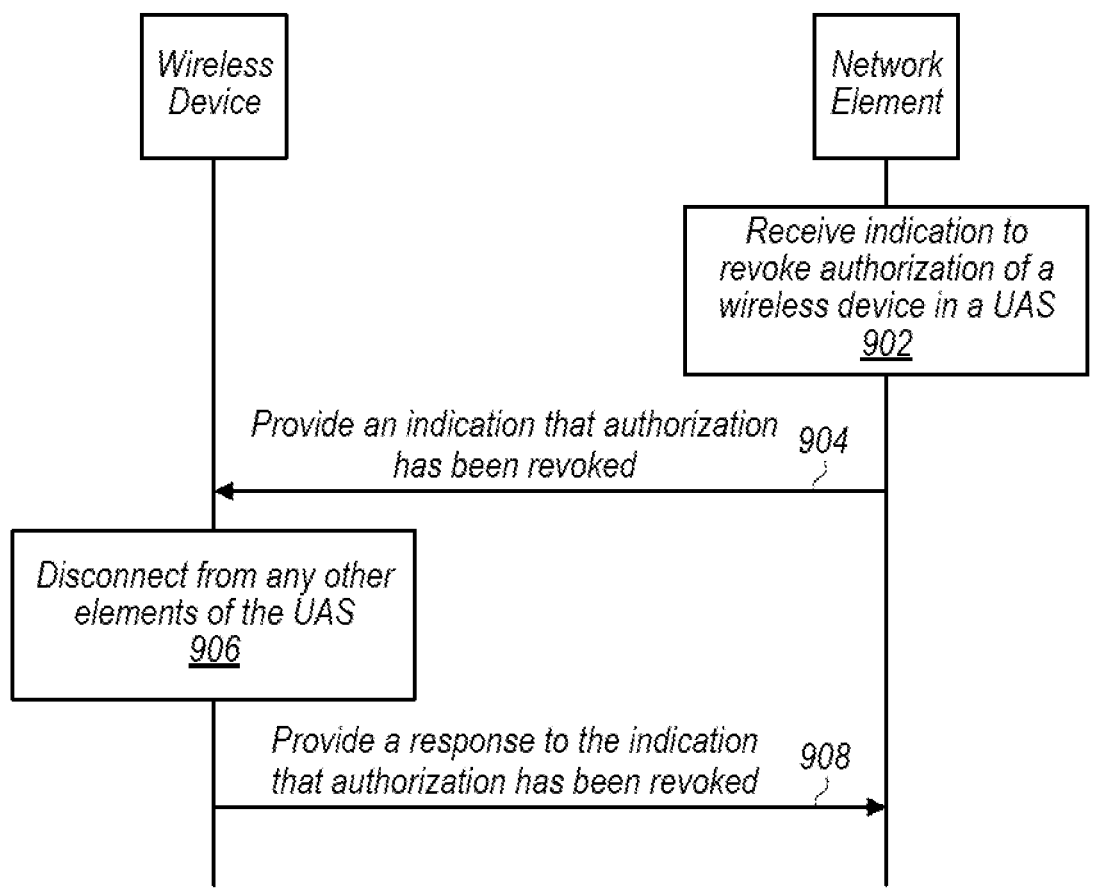
FIG. 9 illustrates aspects of an exemplary possible cellular network architecture that supports unmanned aerial systems, according to some embodiments.

FIG. 9—Authorization Revocation for Unmanned Aerial Vehicles

New cellular communication techniques are continually under development, to increase coverage, to better serve the range of demands and use cases, and for a variety of other reasons. As new cellular communication technologies is developed and deployed, certain features may be included that are new or differ from previously developed and deployed cellular communication technologies.

Providing support and services to unmanned aerial vehicles (e.g., "drones") and unmanned aerial vehicle controllers (e.g., a specialized device dedicated to controlling an unmanned aerial vehicle, or any generalized device configured to control an unmanned aerial vehicle) configured to operate those unmanned aerial vehicles via wireless commands, such as in accordance with the illustrated example wireless communication system and cellular network architecture of FIGS. 7-8, may represent one such possible use case for cellular communication techniques. As part of such a framework, it may be useful to provide support for the possibility of revoking authorization for a wireless device (e.g., a UAV or a UAC) that is registered in an unmanned aerial system. For example, there could be a variety of legitimate reasons for a regulatory, law enforcement, or other entity with authority to request that authorization be revoked for a wireless device that is currently deployed in a UAS to do so.

Accordingly, FIG. 9 is a signal flow diagram illustrating an example of a method for performing authorization revocation for unmanned aerial vehicles and/or associated devices in a wireless communication system, at least according to some embodiments. Aspects of the method of FIG. 9 may be implemented by a wireless device such as a UE 106 illustrated in various of the Figures herein, a base station such as a BS 102 illustrated in various of the Figures herein, a network element such as a UTM function, AMF, or SMF, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 9 may operate as follows.

In 902, a cellular network element may receive an indication to revoke authorization of a wireless device that is an element of an unmanned aerial system (UAS). The cellular network element may include an unmanned aerial system traffic manager (UTM) function of the cellular network, which may receive the indication from a third party (e.g., from a server or other device associated with the third party), such as a government or regulatory entity, e.g., that has authorization to provide such a request for one or more specified legitimate reasons. According to some embodiments, a UTM function receiving such an indication may in turn provide an indication to revoke authorization of the wireless device to another cellular network element of the cellular network, such as an access and management function (AMF) and/or a session management function (SMF). Thus, in some instances, the cellular network element may be an AMF or a SMF that receives the indication from a UTM function of the cellular network.

The wireless device may be authorized and registered with the cellular network when the indication is received. The wireless device may include an unmanned aerial vehicle (UAV), which may be connected to an unmanned aerial controller (UAC) as part of an unmanned aerial system (UAS) registered with the UTM function. The UAV may be aerial, or may be grounded. As another possibility, the wireless device may include a UAC, which may be connected to one or more UAVs as part of a UAS registered with the UTM function.

The indication may include identification information for the wireless device (e.g., an international mobile subscriber identity (IMSI), and/or any of various other types of wireless device identifier). In some instances, the indication may also include information indicating one or more other wireless devices that are associated with the wireless device as part of the UAS, such as an association between a UAV and a UAC. In some instances, the indication may also include location details (e.g., by providing GPS coordinates, or via any of various other possible means) for a location (e.g., a location geofence) to which to navigate the wireless device, e.g., in case the wireless device is a UAV.

In some instances, e.g., when the UAV is not in cellular coverage during its flight path, the AMF may send the authorization revocation request to the UAC, e.g., instead of the UAV. In such a scenario, when UAV returns to cellular coverage, the UAC may send the authorization revocation request to the UAV, e.g., via a C2 command.

In 904, the cellular network element may provide an indication to the wireless device that authorization for the wireless device has been revoked, and/or to disconnect from any other elements of the UAS. For example, the indication may be provided by an AMF of the cellular network to the wireless device by way of a radio access network (RAN) of the cellular network.

According to some embodiments, the indication may include a configuration update command, as one possibility. For example, such an indication may be provided in the case of the wireless device being a UAV, at least according to some embodiments. The configuration update command may include cause code information indicating to the UAV that authorization for the UAV is revoked. The configuration update command may also or alternatively include an indication of the location to which to navigate, and/or C2 command(s) indicating to place control of the UAV under the UTM function. The UTM function may also (e.g., again by way of an AMF and RAN) provide C2 commands to navigate the UAV to the indicated location, at least in some embodiments. Note that in some embodiments, the UTM function may navigate the UAV to the indicated location only if the UAV is aerial when authorization for the UAV is revoked, e.g, to safely land the UAV. Alternatively, the UTM function may navigate the UAV to the indicated location even if the UAV is grounded when authorization for the UAV is revoked, according to some embodiments.

According to some embodiments, the indication may include a de-registration command, as one possibility. For example, such an indication may be provided in the case of the wireless device being a UAC, at least according to some embodiments. The de-registration command may include cause code information indicating to the UAC that authorization for the UAC is revoked. The de-registration command may also or alternatively include C2 command(s) indicating to disconnect from any UAVs in the UAS. Such UAVs may be placed under control of the UTM function, which may provide C2 commands to each such UAV to navigate such UAVs to one or more desired locations, at least in some embodiments. Note that such a de-registration command may also or alternatively be provided to a UAV for which authorization has been revoked, e.g., once it is grounded in a desired location, at least according to some embodiments.

The indication that authorization for the wireless device has been revoked may also or alternatively be provided in any of various other ways. For example, in some instances, the indication may be provided in conjunction with a protocol data unit (PDU) session release command, or in any of various other types of control signaling indications provided from the cellular network to the wireless device.

Note that the cause code information, if provided, may indicate any of various possible cause codes that may be indicative of the authorization of the wireless device being revoked. For example, the cause code information could indicate one or more of: user authentication failed; user authorization failed; illegal user equipment (UE); illegal mobile equipment (ME); or any of various other possible causes, according to various embodiments.

In 906, the wireless device may disconnect from any other elements of the UAS. This may include a UAC disconnecting from any UAVs under its control, or a UAV disconnecting from a UAC that is currently controlling the UAV. In the case of the wireless device being a UAV, the wireless device may also navigate to the location indicated to it, e.g., based at least in part on C2 commands received from the UTM function to navigate it to the indicated location. If the wireless device received a de-registration command, the wireless device may also de-register from the UTM function.

In 908, the wireless device may provide a response to the indication that authorization for the wireless device has been revoked. The response may include a configuration update complete message, or a de-registration accept message (e.g., depending on the type of message used to indicate that authorization for the wireless device has been revoked), e.g., that may be provided to the AMF. The AMF may in turn provide a revocation response to the UTM function, e.g., acknowledging that authorization for the wireless device has been revoked. Similarly, the UTM function may provide a revocation response to the third party, e.g., acknowledging that authorization for the wireless device has been revoked.

Thus, using the techniques of FIG. 9, it may be possible to revoke authorization of a wireless device that is operating as part of a UAS in a cellular communication system, including potentially bringing any aerial UAVs in the UAS to ground in a controlled manner, at least according to some embodiments.

Figure 10:
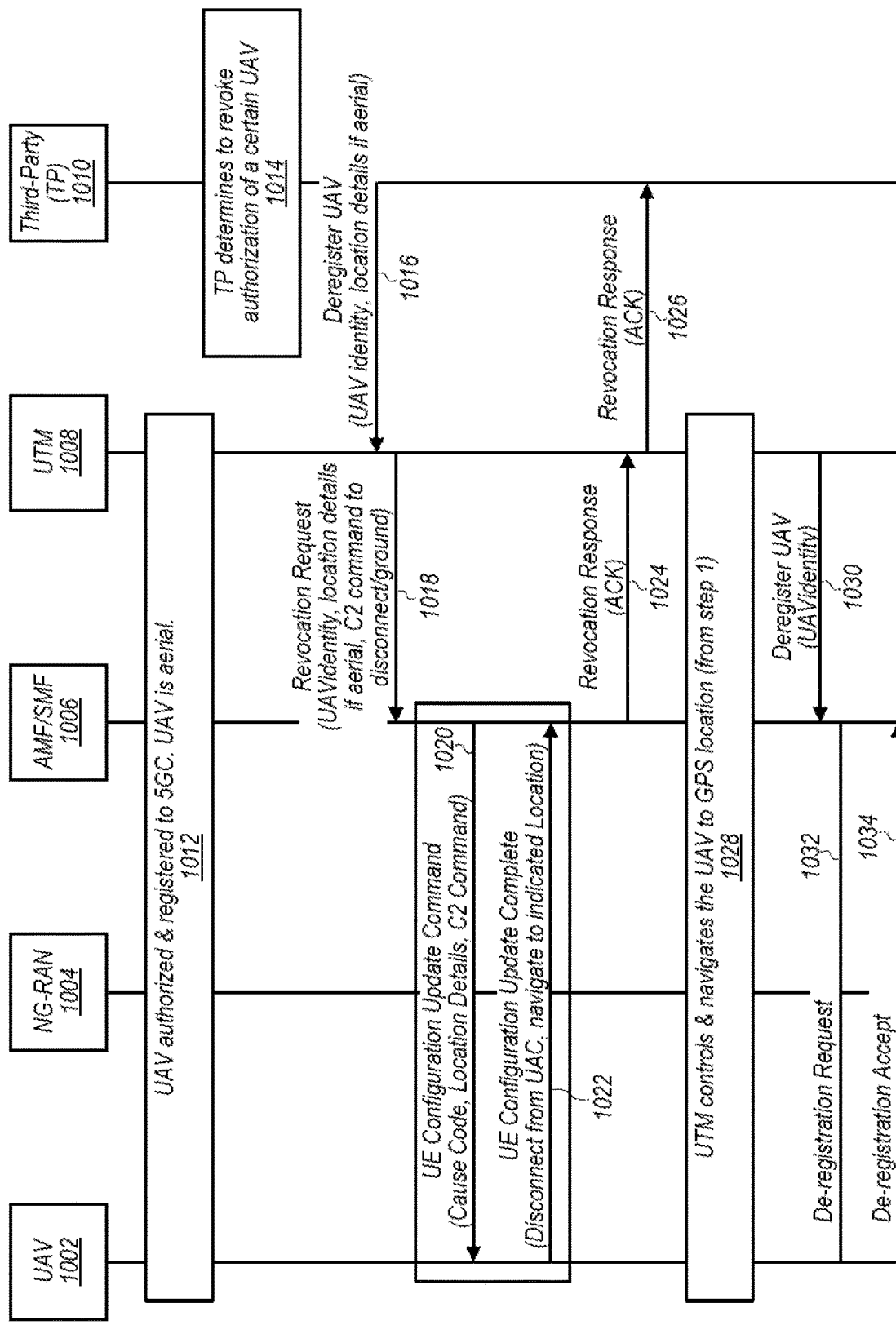
FIGS. 10-12 are communication flow diagrams illustrating possible signaling that could be used to perform authorization revocation for unmanned aerial vehicles in a wireless communication system, according to some embodiments.
Figure 11:
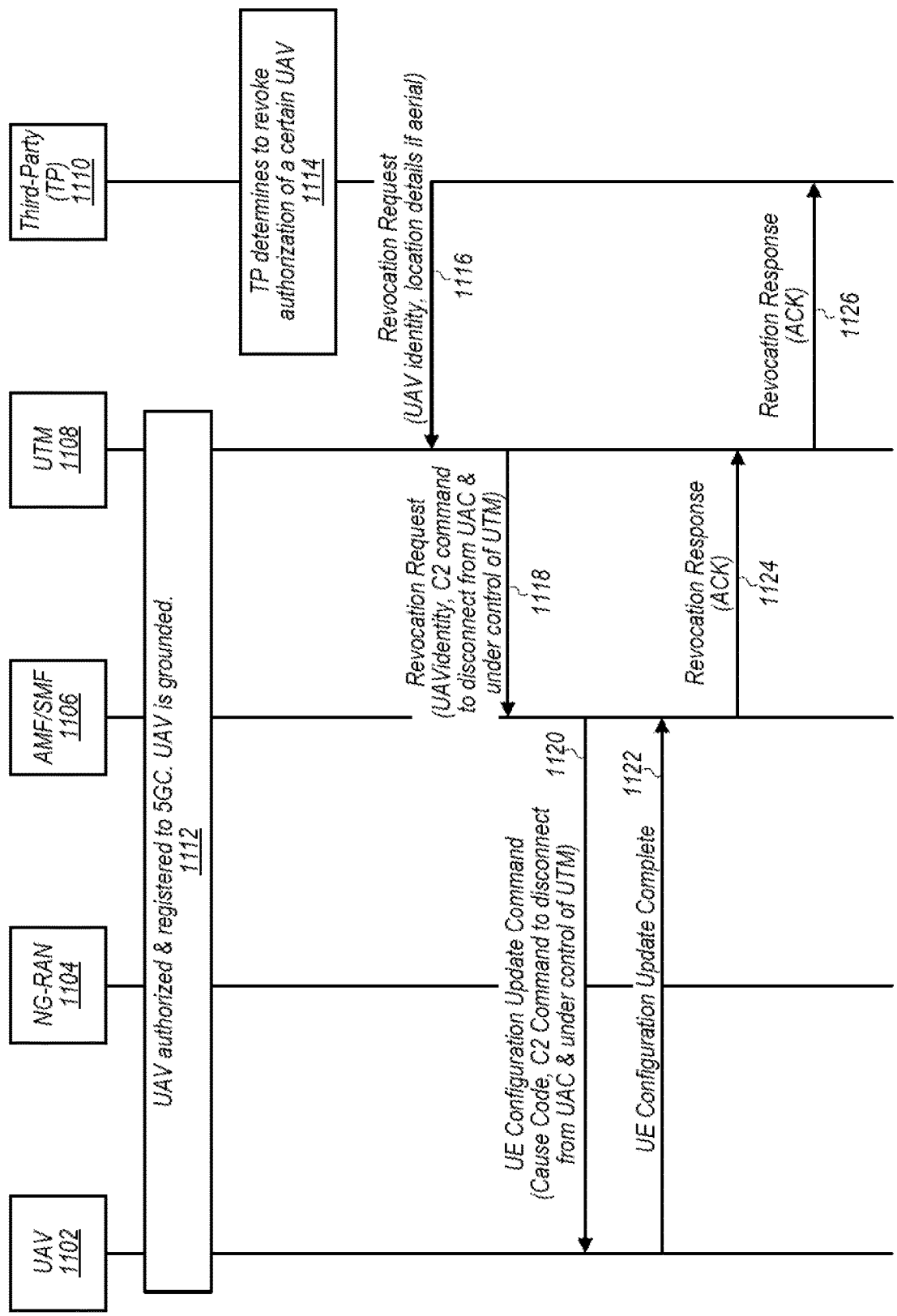
Figure 12:
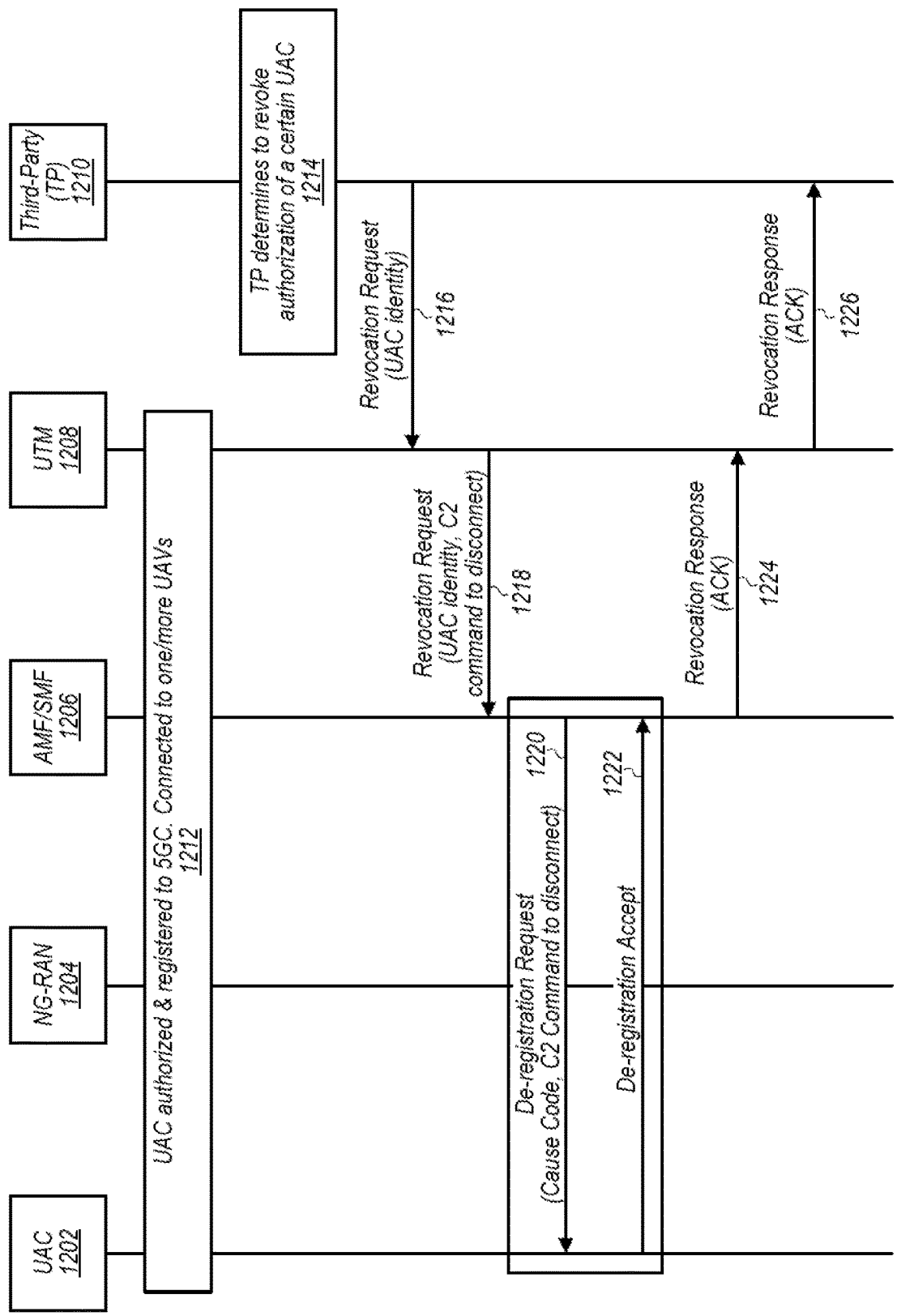

FIGS. 10-12 and Additional Information

FIGS. 10-12 illustrate further aspects that might be used in conjunction with the method of FIG. 9 if desired. It should be noted, however, that the exemplary details illustrated in and described with respect to FIGS. 10-12 are not intended to be limiting to the disclosure as a whole: numerous variations and alternatives to the details provided herein below are possible and should be considered within the scope of the disclosure.

As previously noted herein, a UTM function may support authorization revocation for unmanned aerial vehicles and/or provide various services to the other cellular network elements, at least according to some embodiments. FIGS. 10-12 are communication flow diagrams illustrating further details of possible signaling flows that could be used to perform such authorization revocation for unmanned aerial vehicles in various possible scenarios, according to some embodiments.

FIG. 10 illustrates aspects of a scenario in which a UAV is aerial at the time that authorization is revoked for the UAV. As shown, the communication flow of FIG. 10 may be performed between a UAV 1002, a NG-RAN 1004, an AMF/SMF 1006, a UTM 1008, and a third party (TP) 1010. In 1012, the UAV 1002 may be authorized by the UTM 1008 and registered to the 5GC network. The UAV 1002 may be aerial. In 1014, the TP 1010 may determine to revoke authorization for the UAV 1002. Note that the determination to revoke authorization for the UAV 1002 may be received from any of various possible third parties, such as a government and/or regulatory body, e.g., for any of various legitimate reasons (e.g., in response to illegal use, etc.).

In 1016, the TP may provide a revocation request to the UTM 1008. The revocation request may include an indication of the UAV identity, and may include an indication of a location to which to navigate the UAV (e.g., to land, if aerial, and/or for any of various other possible reasons).

In 1018, the UTM 1008 may forward the revocation request, including the indication of UAV identity and location details (e.g., GPS coordinates) if applicable, to the AMF/SMF 1006. The revocation request provided by the UTM 1008 may also provide a C2 command to disconnect/ground the UAV. In some cases, the UTM may also include information indicating an association between the UAV and a UAC in the same UAS.

In 1020, the AMF/SMF 1006 may provide a UE configuration update (UCU) command to the UAV 1002, via the NG-RAN 1004. The UCU command may include 5GMM cause code information (e.g., indicating user authentication failed, user authorization failed, illegal UE, illegal ME, etc.) indicating that authorization for the UAV is revoked, the location details (e.g., if applicable) and the C2 command(s). In 1022, the UAV 1002 may disconnect from its UAC (at which point it may be under the control of the UTM 1008), and provide a UCU complete response to the AMF/SMF 1006, via the NG-RAN 1004. In 1024, the AMF/SMF 1006 may provide a revocation response acknowledging that the authorization of the UAV 1002 has been revoked to the UTM 1008, and in 1026, the UTM 1008 may in turn provide a revocation response acknowledging that the authorization of the UAV 1002 has been revoked to the third party 1010.

In 1028, the UTM 1008 may control and navigate the UAV 1002 to the indicated location (e.g., as identified using GPS coordinates, as one possibility), via the AMF/SMF 1006 and NG-RAN 1004. In 1030 (e.g., once the UAV is safely grounded at the desired location), the UTM 1008 may provide a request to deregister the UAV 1002 to the AMF/SMF 1006, which may include an indication of the UAV identity. In 1032, the AMF/SMF 1006 may provide a de-registration request to the UAV 1002, and in 1034, the UAV 1002 may provide a de-registration accept message back to the AMF/SMF 1006.

FIG. 11 illustrates aspects of a scenario in which a UAV is grounded at the time that authorization is revoked for the UAV. As shown, the communication flow of FIG. 11 may be performed between a UAV 1102, a NG-RAN 1104, an AMF/SMF 1106, a UTM 1108, and a third party (TP) 1110. In 1112, the UAV 1102 may be authorized by the UTM 1108 and registered to the 5GC network. The UAV 1102 may be grounded. In 1114, the TP 1110 may determine to revoke authorization for the UAV 1102. Note that the determination to revoke authorization for the UAV 1102 may be received from any of various possible third parties, such as a government and/or regulatory body, e.g., for any of various legitimate reasons (e.g., in response to illegal use, etc.).

In 1116, the TP may provide a revocation request to the UTM 1108. The revocation request may include an indication of the UAV identity, and may include an indication of a location to which to navigate the UAV (e.g., to land, if aerial, and/or for any of various other possible reasons).

In 1118, the UTM 1108 may forward the revocation request, including the indication of UAV identity, to the AMF/SMF 1106. Note that since the UAV 1102 is grounded in the scenario of FIG. 11, it may be the case that the UTM 1108 does not provide the location details in the revocation request. Alternatively, the UTM 1108 may still provide the location details (e.g., GPS coordinates), e.g., if it is desired for the UAV 1102 to transport itself to a different location. The revocation request provided by the UTM 1108 may also provide a C2 command to disconnect the UAV 1102 from its UAC and place it under control of the UTM 1108.

In 1120, the AMF/SMF 1106 may provide a UCU command to the UAV 1102, via the NG-RAN 1104. The UCU command may include 5GMM cause code information (e.g., indicating user authentication failed, user authorization failed, illegal UE, illegal ME, etc.) indicating that authorization for the UAV is revoked and the C2 command. In 1122, the UAV 1102 may disconnect from its UAC, and provide a UCU complete response to the AMF/SMF 1106, via the NG-RAN 1104. In 1124, the AMF/SMF 1106 may provide a revocation response acknowledging that the authorization of the UAV 1102 has been revoked to the UTM 1108, and in 1126, the UTM 1108 may in turn provide a revocation response acknowledging that the authorization of the UAV 1102 has been revoked to the third party 1110.

Though not illustrated, if desired, the UTM 1108 may also control and navigate the UAV 1102 to a desired location in the scenario of FIG. 11. Similarly, if/when desired, the UTM 1108 may provide a request to deregister the UAV 1102 to the AMF/SMF 1106, which may include an indication of the UAV identity, based on which the AMF/SMF 1106 may provide a de-registration request to the UAV 1102, and the UAV 1102 may provide a de-registration accept message back to the AMF/SMF 1106.

FIG. 12 illustrates aspects of a scenario in which authorization for a UAC is revoked. As shown, the communication flow of FIG. 11 may be performed between a UAC 1202, a NG-RAN 1204, an AMF/SMF 1206, a UTM 1208, and a third party (TP) 1210. In 1212, the UAC 1202 may be authorized by the UTM 1208 and registered to the 5GC network, and may be connected to one or more UAVs. In 1214, the TP 1210 may determine to revoke authorization for the UAC 1202. Note that the determination to revoke authorization for the UAC 1202 may be received from any of various possible third parties, such as a government and/or regulatory body, e.g., for any of various legitimate reasons (e.g., in response to illegal use, etc.).

In 1216, the TP may provide a revocation request to the UTM 1208. The revocation request may include an indication of the UAC identity.

In 1218, the UTM 1208 may forward the revocation request, including the indication of UAC identity, to the AMF/SMF 1206. The revocation request provided by the UTM 1208 may also provide a C2 command to disconnect the UAC 1202 from any UAVs in the same UAS. Such UAVs may also be provided with C2 commands to place them under control of the UTM 1208.

In 1220, the AMF/SMF 1206 may provide a de-registration request to the UAC 1202, via the NG-RAN 1204. The de-registration request may include 5GMM cause code information (e.g., indicating user authentication failed, user authorization failed, illegal UE, illegal ME, etc.) indicating that authorization for the UAC 1202 is revoked, as well as the C2 command(s). In 1222, the UAC 1202 may disconnect from its UAVs, and provide a de-registration complete response to the AMF/SMF 1206, via the NG-RAN 1204. In 1224, the AMF/SMF 1206 may provide a revocation response acknowledging that the authorization of the UAC 1202 has been revoked to the UTM 1208, and in 1226, the UTM 1208 may in turn provide a revocation response acknowledging that the authorization of the UAC 1202 has been revoked to the third party 1210.

Though not illustrated, if desired, the UTM 1208 may also control and navigate any UAVs that were part of the same UAS as the UAC 1202 to a desired location in the scenario of FIG. 12. Similarly, if/when desired, the UTM 1108 may provide a request to de-register such a UAV to the AMF/SMF 1206, which may include an indication of the UAV identity, based on which the AMF/SMF 1206 may provide a de-registration request to the UAV, and the UAV may provide a de-registration accept message back to the AMF/SMF.

In the following further exemplary embodiments are provided.

One set of embodiments may include a cellular network element of a cellular network, comprising: a network port; and a processor coupled to the network port; wherein the cellular network element is configured to: receive a request to revoke authorization of an unmanned aerial vehicle (UAV); and provide a configuration update command to the UAV based at least in part on the request to revoke authorization of the UAV, wherein the configuration update command indicates to disconnect from a unmanned aerial controller (UAC) associated with the UAV.

According to some embodiments, the request to revoke authorization of the UAV includes an indication of a location to which to navigate for the UAV.

According to some embodiments, the cellular network element is further configured to: provide control commands to navigate the UAV to the indicated location.

According to some embodiments, the indication of a location to which to navigate is provided based at least in part on the UAV being aerial, wherein the location to which to navigate comprises a location for the UAV to land.

According to some embodiments, the configuration update command includes cause code information indicating to the UAV that authorization for the UAV is revoked.

According to some embodiments, the configuration update command further includes an indication to place the UAV under command of an unmanned aerial system traffic manager (UTM) function of the cellular network.

According to some embodiments, the request to revoke authorization of the UAV is received from an unmanned aerial system traffic manager (UTM) function of the cellular network, wherein the cellular network element is further configured to: receive a configuration update complete response from the UAV; and provide an authorization revocation response to the UTM based at least in part on the configuration update complete response, wherein the authorization revocation response indicates that authorization of the UAV has been revoked.

Another set of embodiments may include an apparatus, comprising: a processor configured to cause a cellular network element of a cellular network to: receive a request to revoke authorization of a wireless device, wherein the wireless device comprises an element of an unmanned aerial system (UAS); and provide an indication to disconnect from any other elements of the UAS to the wireless device based at least in part on the request to revoke authorization.

According to some embodiments, the wireless device comprises an unmanned aerial vehicle (UAV), wherein the request to revoke authorization of the wireless device includes an indication of a location to which to navigate.

According to some embodiments, the processor is further configured to cause the cellular network element to: determine that the UAV is not in cellular coverage and that an unmanned aerial controller (UAC) of the UAS is in cellular coverage; and provide the indication to disconnect from any other elements of the UAS to the UAC of the UAS, wherein the indication to disconnect from any other elements of the UAS is configured to be provided from the UAC to the UAV upon the UAV returning to cellular coverage.

According to some embodiments, the wireless device comprises an unmanned aerial controller (UAC), wherein the request to revoke authorization of the wireless device includes an indication to disconnect from one or more unmanned aerial vehicles (UAVs) of the UAS.

According to some embodiments, the processor is further configured to cause the cellular network element to: provide an indication to each respective UAV of the UAS to place the UAV under command of an unmanned aerial system traffic manager (UTM) function of the cellular network.

According to some embodiments, the processor is further configured to cause the cellular network element to: provide cause code information indicating to the wireless device that authorization for the wireless device is revoked.

According to some embodiments, the cellular network element comprises an access and management function (AMF) of the cellular network, wherein the request to revoke authorization of the wireless device is received from an unmanned aerial system traffic manager (UTM) function of the cellular network.

According to some embodiments, the processor is further configured to cause the cellular network element to: provide a response to the UTM function of the cellular network indicating that authorization of the wireless device has been revoked.

According to some embodiments, the cellular network element comprises an unmanned aerial system traffic manager (UTM) function of the cellular network, wherein the request to revoke authorization of the wireless device is received from a third party, wherein the indication to disconnect from any other elements of the UAS is provided to the wireless device by way of an access and management function (AMF) of the cellular network.

According to some embodiments, the processor is further configured to cause the cellular network element to: receive a response from the AMF function of the cellular network indicating that authorization of the wireless device has been revoked; and provide a response to the third party indicating that authorization of the wireless device has been revoked.

Yet another set of embodiments may include a method, comprising: by a wireless device in an unmanned aerial system (UAS): receiving an indication from a cellular network element of a cellular network that authorization of the wireless device is revoked, wherein the indication further comprises a command to disconnect from any other elements of the UAS; disconnecting from any other elements of the UAS; and providing an indication acknowledging that authorization of the wireless device is revoked to the cellular network element.

According to some embodiments, the wireless device comprises an unmanned aerial vehicle (UAV), wherein the method further comprises: receiving an indication of a location to which to navigate from the cellular network element; receiving command and control (C2) information configured to navigate the UAV to the location from the cellular network element; and navigating to the location based at least in part on the C2 information.

According to some embodiments, the wireless device comprises an unmanned aerial controller (UAC), wherein the UAC is connected to one or more UAVs in the UAS, wherein the method further comprises: disconnecting from the one or more UAVs in the UAS based at least in part on the indication that authorization of the wireless device is revoked; and deregistering from an unmanned aerial system traffic manager (UTM) function of the cellular network based at least in part on the indication that authorization of the wireless device is revoked.

According to some embodiments, the indication that authorization of the wireless device is revoked comprises cause code information indicating one or more of: user authentication failed; user authorization failed; illegal user equipment (UE); or illegal mobile equipment (ME).

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cellular network element of a cellular network, comprising:
   a network port; and
   a processor coupled to the network port;
   wherein the cellular network element is configured to:
      receive a request to revoke authorization of an unmanned aerial vehicle (UAV) of an unmanned aerial system (UAS), wherein the request to revoke authorization of the UAV includes an indication of a first location geofence to which to navigate for the UAV;
      determine that the UAV is not in cellular coverage during its flight path;
   in response to the determination that the UAV is not in cellular coverage during its flight path and that:
      determine that an unmanned aerial controller (UAC) of the UAS is in cellular coverage; and
      determine, because the UAC is configured to provide commands to the UAV, to provide one or more commands to the UAC instead of the UAV, wherein the one or more commands are configured to be provided from the UAC to the UAV upon the UAV returning to cellular coverage, wherein the one or more commands comprise:
         an indication to navigate the UAV to the first location geofence; and
         a configuration update command or a protocol data unit (PDU) Session Release Command to the UAV based at least in part on the request to revoke authorization of the UAV, wherein the configuration update command or the PDU Session Release Command indicates to disconnect from the UAC, wherein the configuration update command or the PDU Session Release Command comprises a C2 command.

2. The cellular network element of claim 1,
   wherein the indication of the first location geofence is provided based at least in part on the UAV being aerial, wherein the one or more commands further comprises a location for the UAV to land.

3. The cellular network element of claim 1,
   wherein the configuration update command or the PDU Session release command includes cause code information indicating to the UAV that authorization for the UAV is revoked or failed.

4. The cellular network element of claim 1, wherein the configuration update command further includes an indication to place the UAV under command of an unmanned aerial system traffic manager (UTM) function of the cellular network.

5. The cellular network element of claim 1, wherein the request to revoke authorization of the UAV is received from an unmanned aerial system traffic manager (UTM) function of the cellular network, wherein the cellular network element is further configured to:
   receive a configuration update complete response from the UAV; and
   provide an authorization revocation response to the UTM based at least in part on the configuration update complete response, wherein the authorization revocation response indicates that authorization of the UAV has been revoked.

6. The cellular network element of claim 1, wherein the request to revoke authorization of the UAV further includes an indication to disconnect from the UAC.

7. The cellular network element of claim 6, wherein the cellular network element is further configured to:
   provide an indication to each respective UAV of the UAS to place the respective UAV under command of an unmanned aerial system traffic manager (UTM) function of the cellular network.

8. The cellular network element of claim 1, wherein the cellular network element is further configured to:
   provide cause code information indicating that authorization for the UAV is revoked.

9. The cellular network element of claim 1,
   wherein the cellular network element comprises an access and management function (AMF) of the cellular network,
   wherein the request to revoke authorization of the UAV is received from an unmanned aerial system traffic manager (UTM) function of the cellular network, wherein the cellular network element is further configured to:
   provide a response to the UTM function of the cellular network indicating that authorization of the UAV has been revoked.

10. The cellular network element of claim 1,
    wherein the cellular network element comprises an unmanned aerial system traffic manager (UTM) function of the cellular network,
    wherein the request to revoke authorization of the UAV is received from a third party,
    wherein the configuration update command or the PDU Session Release Command is provided to the UAV by way of an access and management function (AMF) of the cellular network.

11. The cellular network element of claim 10, wherein the cellular network element is further configured to:
    receive a response from the AMF of the cellular network indicating that authorization of the UAV has been revoked; and provide a response to the third party indicating that authorization of the UAV has been revoked.

12. An apparatus, comprising:
a processor, wherein the processor is configured to cause a cellular network element of a cellular network to:
receive a request to revoke authorization of an unmanned aerial vehicle (UAV) of an unmanned aerial system (UAS), wherein the request to revoke authorization of the UAV includes an indication of a first location geofence to which to navigate for the UAV;
determine that the UAV is not in cellular coverage during its flight path;
in response to the determination that the UAV is not in cellular coverage during its flight path:
determine that an unmanned aerial controller (UAC) of the UAS is in cellular coverage; and
determine, because the UAC is configured to provide commands to the UAV, to provide one or more commands to the UAC instead of the UAV, wherein the one or more commands are configured to be provided from the UAC to the UAV upon the UAV returning to cellular coverage, wherein the one or more commands comprise:
an indication to navigate the UAV to the first location geofence; and
a configuration update command or a protocol data unit (PDU) Session Release Command to the UAV based at least in part on the request to revoke authorization of the UAV, wherein the configuration update command or the PDU Session Release Command indicates to disconnect from the UAC, wherein the configuration update command or the PDU Session Release Command comprises a C2 command.

13. The apparatus of claim 12,
wherein the indication of the first location geofence is provided based at least in part on the UAV being aerial, wherein the one or more commands further comprises a location for the UAV to land.

14. The apparatus of claim 12,
wherein the configuration update command or the PDU Session release command includes cause code information indicating to the UAV that authorization for the UAV is revoked or failed.

15. The apparatus of claim 12, wherein the configuration update command further includes an indication to place the UAV under command of an unmanned aerial system traffic manager (UTM) function of the cellular network.

16. The apparatus of claim 12, wherein the request to revoke authorization of the UAV is received from an unmanned aerial system traffic manager (UTM) function of the cellular network, wherein the processor is further configured to cause the cellular network element to:

receive a configuration update complete response from the UAV; and
provide an authorization revocation response to the UTM based at least in part on the configuration update complete response, wherein the authorization revocation response indicates that authorization of the UAV has been revoked.

17. A method, comprising:
at a cellular network element of a cellular network:
receive a request to revoke authorization of an unmanned aerial vehicle (UAV) of an unmanned aerial system (UAS), wherein the request to revoke authorization of the UAV includes an indication of a first location geofence to which to navigate for the UAV;
determine that the UAV is not in cellular coverage during its flight path;
in response to the determination that the UAV is not in cellular coverage during its flight path:
determine that an unmanned aerial controller (UAC) of the UAS is in cellular coverage; and
determine, because the UAC is configured to provide commands to the UAV, to provide one or more commands to the UAC instead of the UAV, wherein the one or more commands are configured to be provided from the UAC to the UAV upon the UAV returning to cellular coverage, wherein the one or more commands comprise:
an indication to navigate the UAV to the first location geofence; and
a configuration update command or a protocol data unit (PDU) Session Release Command to the UAV based at least in part on the request to revoke authorization of the UAV, wherein the configuration update command or the PDU Session Release Command indicates to disconnect from the UAC, wherein the configuration update command or the PDU Session Release Command comprises a C2 command.

18. The method of claim 17,
wherein the indication of the first location geofence is provided based at least in part on the UAV being aerial, wherein the one or more commands further comprises a location for the UAV to land.

19. The method of claim 17,
wherein the configuration update command or the PDU Session release command includes cause code information indicating to the UAV that authorization for the UAV is revoked or failed.

20. The method of claim 17, wherein the configuration update command further includes an indication to place the UAV under command of an unmanned aerial system traffic manager (UTM) function of the cellular network.

* * * * *

UNITED STATES PATENT AND TRADEMARK OFFICE
CERTIFICATE OF CORRECTION

| | | |
|---|---|---|
| PATENT NO. | : 12,414,197 B2 | Page 1 of 1 |
| APPLICATION NO. | : 17/174701 | |
| DATED | : September 9, 2025 | |
| INVENTOR(S) | : Alosious Pradeep Prabhakar et al. | |

It is certified that error appears in the above-identified patent and that said Letters Patent is hereby corrected as shown below:

In the Claims

Column 23, Line 48, delete "and that"

Signed and Sealed this
Twenty-first Day of October, 2025

John A. Squires
*Director of the United States Patent and Trademark Office*